July 9, 1940.　　　　W. E. STOUT　　　　2,206,925

TRANSMISSION FOR A POWER DEVICE

Original Filed March 22, 1939

Inventor
William E. Stout
By Lester L. Sargent
Attorney

Patented July 9, 1940

2,206,925

UNITED STATES PATENT OFFICE 2,206,925

TRANSMISSION FOR A POWER DEVICE

William E. Stout, Los Angeles, Calif.

Original application March 22, 1939, Serial No. 263,491. Divided and this application August 11, 1939, Serial No. 289,678

2 Claims. (Cl. 74—411)

This application is a division of my co-pending application, Serial No. 263,491, filed March 22, 1939.

The object of my invention is to provide a novel and effective transmission for a power device primarily for use on airplanes and submarines, and especially to provide a power device which will eliminate the hazard of gasoline motors in airplanes and submarines and substitute for them an electro-mechanical power plant. It is also within the contemplation of my invention to utilize my transmission for obtaining increased power in connection with other machinery or devices other than airplanes and submarines.

I attain these and other objects of my invention by the apparatus illustrated in the accompanying drawing, in which—

Like numerals designate like parts in each of the several views.

Figure 1:
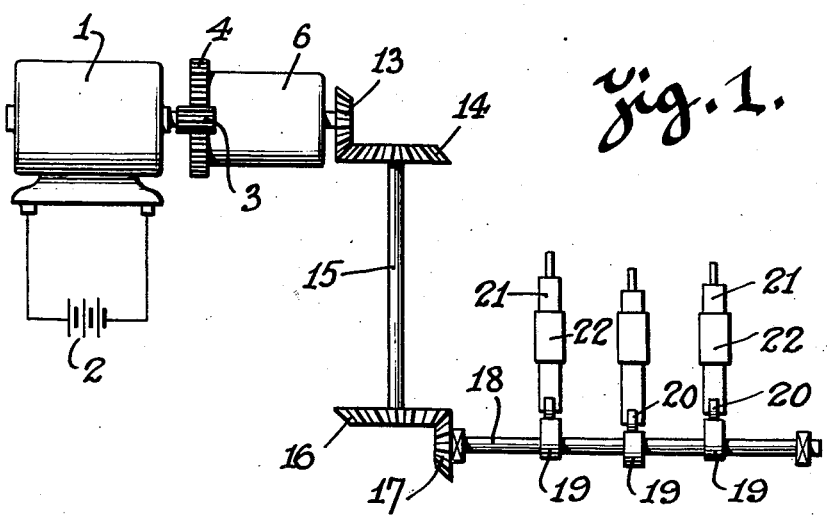
Figure 1 is a somewhat diagrammatic front plan view of my transmission for a power device.
Figure 2:
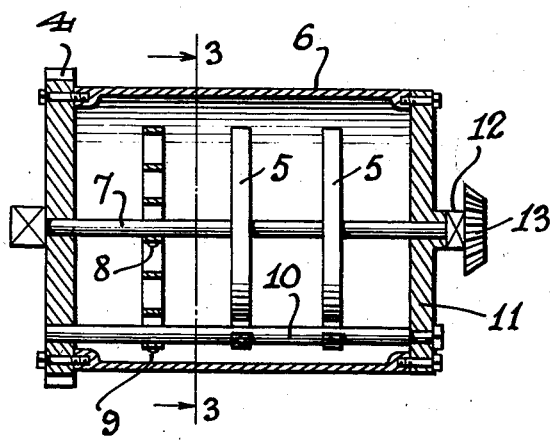
Fig. 2 is a longitudinal section showing my spring connecting mechanism.
Figure 3:
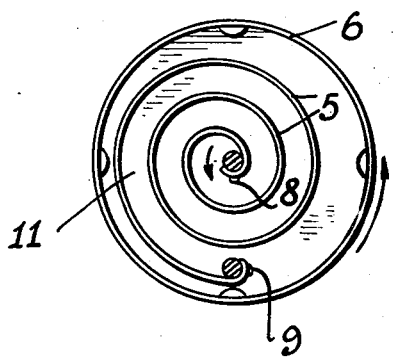
Fig. 3 is a transverse section on line 3—3 of Fig. 2.

Referring to the accompanying drawing, I provide an electric motor 1, electrically connected with a suitable battery 2. The drive shaft 1a of motor 1 carries a pinion 3 meshing with the end gear 4 of the spring cylinder 6. Within the cylinder 6 are one or more, preferably a plurality of, coil springs 5. Each of said springs have the inner end affixed to the shaft 7 at 8, as shown in Fig. 3, and have their outer ends 9 affixed to a bar 10 which extends longitudinally through the cylinder and is mounted on the cylinder end 11, as shown in Fig. 2. The shaft 7 is loosely mounted in suitable bearings 12, and carries a bevel gear 13 meshing with the gear 14 on shaft 15, which shaft in turn carries a bevel gear 16 meshing with bevel gear 17 on a shaft 18.

The shaft 18 carries a series of eccentrics or cams 19, each of which engages a roller 20 carried by a vertically extending rod 21. Shaft 21 is mounted in a suitable vertical guide 22, as shown in Fig. 3. Rod 21 is operatively connected with a member to be operated.

The springs 5 function to take up the thrust when the electric motor is started so that the driven mechanism starts off smoothly, and they also function to prevent a slowing down of the motor when the machine is set in operation, due to the fact that the springs effect a smoother and more even operation of the mechanism.

What I claim is:

1. A power device comprising an electric motor having a drive shaft, a pinion on said drive shaft, a gear meshing with said pinion, a cylinder, ends on the cylinder, one of the ends being the aforesaid gear, a bar mounted longitudinally in the ends of the cylinder in proximity to its periphery, a central shaft loosely mounted in the cylinder, coil springs having their outer ends affixed to the aforesaid bar and having their inner ends affixed to the aforesaid central shaft, a shaft operatively connected to and driven by said central shaft, eccentrics mounted on said last-mentioned shaft, rods driven by said eccentrics, and guides for said rods.

2. A power device comprising an electric motor having a drive shaft, a pinion on said drive shaft, a gear meshing with said pinion, a cylinder, ends on the cylinder, one of the ends being the aforesaid gear, a bar mounted longitudinally in the ends of the cylinder in proximity to its periphery, a central shaft loosely mounted in the cylinder, coil springs having their outer ends affixed to the aforesaid bar and having their inner ends affixed to the aforesaid central shaft, a bevel gear on said shaft, a second bevel gear with which the first-mentioned bevel gear is connected, a drive shaft carrying said bevel gear, eccentrics mounted on said last-mentioned shaft, rods driven by said eccentrics, and guides for said rods.

WILLIAM E. STOUT.